United States Patent
Ward et al.

(10) Patent No.: US 6,652,752 B2
(45) Date of Patent: Nov. 25, 2003

(54) BIODEGRADATION OF OIL SLUDGE

(76) Inventors: Owen P. Ward, 284 Old Post Road, Waterloo, Ontario (CA), N2L 5C1; Ajay Singh, 491 Timbercroft Crescent, Waterloo, Ontario (CA), N2T 2J3

( * ) Notice: Subject to any disclaimer, the term of this patent is extended or adjusted under 35 U.S.C. 154(b) by 0 days.

(21) Appl. No.: 10/351,616

(22) Filed: Jan. 21, 2003

(65) Prior Publication Data

US 2003/0150801 A1 Aug. 14, 2003

Related U.S. Application Data

(63) Continuation-in-part of application No. 09/380,179, filed as application No. PCT/CA98/00108 on Feb. 17, 1998, now abandoned.

(30) Foreign Application Priority Data

Mar. 5, 1997 (CA) .............................................. 2199204

(51) Int. Cl.$^7$ .................................................. C02F 3/00
(52) U.S. Cl. ...................... 210/610; 210/739; 210/626; 210/743; 210/192; 210/629
(58) Field of Search ................................. 210/610, 620, 210/629, 739, 743, 192

(56) References Cited

U.S. PATENT DOCUMENTS 4,649,281 A * 3/1987 Schmitt et al. ............. 250/574

FOREIGN PATENT DOCUMENTS

| EP | 0 498 900 A1 | * | 8/1992 |
| WO | WO 98/39259 | * | 9/1998 |

OTHER PUBLICATIONS www.petrozyme.com/company.htm, www.petrozyme.com/tech.htm, www.petrozyme.com/facts.htm, all "last modified" in Apr., 2000.*

* cited by examiner

Primary Examiner—Chester T. Barry
(74) Attorney, Agent, or Firm—Anthony Asquith & Co.

(57) ABSTRACT

A method for the biodegradation on an oil-based sludge comprising a mixture of petroleum hydrocarbons is disclosed. The method comprises forming an aqueous solution in a reactor of an oil-in-water emulsion of the oil-based sludge, bacterial culture and nutrients for the bacterial culture, the bacterial culture having the ability to grow on petroleum hydrocarbons as sole carbon source and having been isolated from a hydrocarbon contaminated soil or hydrocarbon-containing sludge or other environments rich in hydrocarbon degrading bacteria, maintainingthe aqueous solution under aerobic conditions in the reactor at a temperature of at least 10° C. for a period of time sufficient to reduce the amount of hydrocarbon by at least 25%, and discharging aqueous solution having a reduced amount of hydrocarbons from the reactor. The method may be used on sludge containing aromatics, resins and asphaltenes.

28 Claims, No Drawings

BIODEGRADATION OF OIL SLUDGE

This application is a continuation-in-part of patent application Ser. No. 09/380,179, filed Dec. 9, 1999, now abandoned, which is a national stage application filed under 35 U.S.C. §371 of international application PCT/CA98/00108, filed Feb. 17, 1998.

The present invention is directed to the treatment of oil sludges, and in particular to biodegradation of oil sludges to environmentally-acceptable products. As such, the present invention is directed to the treatment of compositions with high sludge/total petroleum hydrocarbon concentrations, examples of which are oil refinery sludges, tank-bottom sludges from oil storage tanks or tankers, sludges from residues at oil wells, so called slop oil or treater emulsions, oil sludges from processing of solids coritaining oil wastes including centrifuged sludges, clay fines, and drilling mud residues. In contrast to waste water treatment processes utilizing low total petroleum hydrocarbon concentrations or processes for the production of single cell protein, biomass or bacterial cells.

Biodegradation of crude oil materials has primarily been directed to the clean up i.e bioremediation, of oil-contaminated soils and shorelines, as a result of onland oil spills from, for example, underground storage tanks, or from oil tankers at sea. Such bioremediation of hydrocarbons generally involves creation of conditions in the soil or on the shoreline that promote growth of microorganisms using the petroleum hydrocarbons, facilitating conversion of the hydrocarbons to biomass and/or their degradation, ultimately to carbon dioxide and water. The hydrocarbons are the source of carbon for microbial growth, although it may be necessary to add other ingredients, especially nitrogen and phosphorus, as fertilizers. Microorganisms also require a range of inorganic ions for growth, but such ions are generally present in adequate quantities in the soil that is being treated.

Bioremediation processes generally utilize aerobic microorganisms that require aeration/oxygenation by maximizing contact of the contaminated material with atmospheric oxygen through procedures of soil tilling or by aerating using positive or negative pressure air pumping systems.

The general hierarchy of microbial activity in crude oil is understood to be aliphatics> aromatics> resins> asphaltenes. Thus, aromatic and high molecular weight hydrocarbons are more difficult to degrade, compared to the lower alkanes.

Liquid-solid treatment systems have also been used to degrade petroleum hydrocarbons. However, long degradation treatment periods were encountered, e.g 50–100 days. Land treatment of waste crude oils and refinery oil sludges has been used for many years as a method of disposal of oil and sludge. Microbial growth and biodegradation rates tend to be suboptimal in land farming processes and the process is not easily controlled. In addition the process is influenced by soil composition, weather and temperature, as well as the methods used for tilling in the land farming process. For large refineries, large areas of land have to be committed to such a process, and moreover the first step in the process involves contamination of the soil with the oils to be degraded.

U.S. Pat. No. 3,899,376 discloses a single or multi-tank system that is primarily directed to waste water treatment. The process utilizes a particular bacterial strain from a culture collection for the bioremediation process.

U.S. Pat. No. 5,364,789 discloses a microbial cleaner comprising at least one hydrocarbon-ingesting microbe strain and a biocatalyst that transforms hydrocarbons into non-toxic substances. The biocatalyst includes a non-ionic surfactant, a chlorine-absorbing salt, at least one microbe nutrient and water. It is stated that the cleaner may be used in virtually any situation requiring the removal of hydrocarbons, including cleaning contaminated soil and treating oil spills on soil and water.

A method for the biodegradation of a petroleum hydrocarbon sludge fraction has now been found, such method using a reactor.

Accordingly, an aspect of the present invention provides a method for the biodegradation of an oil-based sludge, said oil-based sludge comprising a mixture of petroleum hydrocarbons, said method comprising the steps of:

(a) forming an aqueous mixture in a reactor of an oil-in-water emulsion, bacterial culture and nutrients for said bacterial culture, said oil-in-water emulsion being an emulsion of said oil-based sludge in water, said bacterial culture having the ability to grow on petroleum hydrocarbons as sole carbon source and having been isolated from a hydrocarbon contaminated soil or hydrocarbon-containing sludge or other environments rich in hydrocarbon degrading bacteria, by microbial enrichment techniques using hydrocarbons in the selection medium, said reactor containing up to 50% by volume of total petroleum hydrocarbons;

(b) maintaining said aqueous mixture under aerobic conditions in the reactor at a temperature of at least 10° C. for a period of time sufficient to reduce the amount of hydrocarbon by at least 25%, and at a pH conducive to the promotion of bacterial growth and hydrocarbon degradation; and (c) discharging the aqueous mixture having a reduced amount of said hydrocarbons from said reactor.

In a preferred embodiment of the present invention, the nutrients comprise bioavailable nitrogen, phosphorous and potassium compounds, especially in which the nitrogen compound is an ammonium ion, nitrate or organic nitrogen, and the phosphorus is phosphate.

In another embodiment, the reactor contains about 5–50% by volume of total petroleum hydrocarbons, especially about 10–30% by volume of total petroleum hydrocarbons. The oil-based sludge preferably contains hexane-extractable hydrocarbons in an amount in the range of up to 500,000 ppm, especially in the range of 65,000–250,000 ppm. For clarity, the expression total petroleum hydrocarbons (or TPHs) as used herein is defined as hexane-extractable hydrocarbons including hexane soluble hydrocarbons.

In yet another embodiment, the nutrients are in proportions corresponding to relative proportions in bacterial cells, and supplied at concentrations which promote high levels of bacterial growth and high rates of hydrocarbon degradation.

In further embodiments, the petroleum hydrocarbons consist of mixtures of saturated hydrocarbons, aromatic hydrocarbons, hydrocarbon resins and asphaltenes, especially petroleum hydrocarbons obtained from petroleum refinery sludge, from the bottom of a storage tank for oil, from an on-land well head or from the washing of a hold in a tanker.

In other embodiments, the amount of nitrogen required to support the process is in the range of 50–1000 ppm, and preferably in the range of 300–700 ppm, and the minimum amount of phosphate is in the range of 10–200 ppm and preferably 50–150 ppm.

In additional embodiments, the aqueous mixture contains a surfactant, more especially a non-ionic or an anionic surfactant. The surfactant is in an amount sufficient to form said oil-in-water emulsion, especially in which the amount of surfactant is less than 2500 ppm and preferably less than 1500 ppm. It is preferred that the ratio of the amount of petroleum hydrocarbon to surfactant be at least 40:1.

The method of the present invention relates to the biodegradation of an oil-based sludge. The oil-based sludge comprises a mixture of petroleum hydrocarbons and may include non-petroleum solid or liquid contaminants and water. The petroleum hydrocarbon mixture would normally comprise a mixture of aliphatic hydrocarbons, aromatic hydrocarbons, hydrocarbon resins and asphaltenes.

The present invention is particularly directed to the biodegradation of a mixture of the petroleurm hydrocarbon from among the aliphatics, aromatics, resins and asphaltenes. Such mixtures of petroleum hydrocarbons may be obtained from a variety of sources. For instance, the mixture may be in form of a sludge obtained from a petroleum refinery. The sludge may also be obtained from the bottom of a storage tank that has been used for the storage of petroleum oil, with the sludge being obtained particularly when the storage tank is cleaned or drained. Alternatively, the mixture of hydrocarbons could be a petroleum residue obtained from around an on-land well head, be an oil-containing clay fines material or be or from the cleaning of a hold of a tanker used for the transportation of petroleum products. The mixture of petroleum hydrocarbons, which is referred to herein as a sludge, may also be obtained from a variety of other sources. In each case, the sludge is characterized by having a substantial proportion of heavy end petroleum hydrocarbons which may require use of a solubilizing agent or surfactant to facilitate mixing and dispersal in water, as an oil-in-water emulsion.

The method of the present invention is carried out in a reactor. It is preferred that the reactor be a single stage reactor that is charged with the aqueous mixture described herein, allowed to incubate for a period of time to reduce the amount of hydrocarbons within the aqueous mixture, and then subsequently discharged from the reactor. Nonetheless, it is to be understood that the reactor could be in the form of a series of reactors in which the aqueous mixture is passed from reactor to reactor before being finally discharged from the process for the biodegradation of the sludge.

In the method, an aqueous mixture is fed to the reactor. The aqueous mixture is comprised of an oil-in-water emulsion, bacterial culture and nutrients for the bacterial culture. The sludge is in the form of the oil-in-water emulsion.

The amount of petroleum hydrocarbons fed to the reactor is primarily governed by the formation of the oil-in-water emulsion. In particular, the aqueous mixture may contain up to 50% by volume of total petroleum hydrocarbons. In preferred embodiments, the reactor contains 5–50% by volume of total petroleum hydrocarbons, especially 10–30% by volume.

The oil-based sludge contains hexane-extractable hydrocarbons. In preferred embodiments, the amount of hexane-extractable hydrocarbons is up to 500,000 ppm, especially in the range of 65,000–250,000 ppm.

It would normally be necessary to incorporate a surfactant into the aqueous mixture and to subject the aqueous mixture to agitation in order to form the oil-in-water emulsion. The surfactant is preferably a non-ionic or an anionic surfactant, and is used in an amount sufficient to form the emulsion. Nonetheless, the amount of the surfactant is preferably less than 2500 and particularly less than 1500 ppm. In addition, the amount of surfactant, if added, is maintained at as low a level as is consistent with obtaining the oil-in-water emulsion. In particular, it is preferred that the ratio of petroleum hydrocarbon to surfactant be at least 40:1, and especially at least 60:1.

The aqueous mixture also contains a bacterial culture. The bacterial culture used in the method of the present invention is a natural-occurring bacterial culture. Such a culture may be isolated from a hydrocarbon-contaminated soil or from hydrocarbons-containing sludge or from other environments, including soil or activated sludge, which may be rich in hydrocarbon-degrading bacteria, and inoculated in a basal medium, as described herein. The bacterial culture is selected by its ability to grow on petroleum hydrocarbons as the predominant source of carbon in the basal medium.

Bacterial enrichment techniques for isolation of a bacterial culture capable of growing on hydrocarbons are well understood in the art. Typical techniques comprise adding a sample of soil, sludge or other material containing a large population of bacteria to an aqueous medium containing hydrocarbons as the only or predominant carbon source. Other chemical components including an inorganic nitrogen source, phosphorous and salts necessary to support bacterial growth are also added. Such a medium can be used to preferentially promote multiplication of hydrocarbon-degrading bacteria using standard aerobic microbial cultivation methods, including incubation in aerated microbial culture vessels. By transfer of a small amount of the resultant growth culture to further samples of the same medium and repeating the process one or more times, an efficient hydrocarbon degrading culture is selected. The culture can be maintained or stored using methods well known in the art.

In order to prepare a high density culture for use as an inoculum for sludge degradation, the maintained culture may be inoculated into an aqueous medium consisting of the nutrients described herein, supplemented with petroleum hydrocarbons and incubated in an aerated reactor or fermenter or other culture vessel.

The preferred inoculum volume is 0.1–20% by volume of total culture volume, preferably 1–5% by volume. The preferred concentration of petroleum hydrocarbons used in this inoculum development medium is 0.5–5%, and can be obtained from various sources including petroleum sludges, crude oils or refined oils such as diesel oil.

A typical aeration rate of the inoculum reactor is 0.1–1.0 volumes of air per volume of medium per minute, with the culture incubated in the temperature range 20–37° C. for 1–7 days, preferably at 27–33° C., at a pH generally maintained in the range 6.5–8.0, preferably in the range 7–7.5. The resultant bacterial culture may be used to inoculate the reactor containing the sludge to be degraded, at a rate of 0.1–20% of total sludge volume, preferably 1–5%. Where a much larger volume of inoculum is required, the resultant inoculum may be transferred as an inoculum to a larger culture vessel and the culture development process repeated on the larger scale.

The aqueous mixture fed to the reactor also contains nutrients for the bacterial culture. A wide variety of nutrients for the bacterial culture may be used, as will be understood by persons skilled in the art. Such nutrients will include nitrogen, phosphorus and potassium compounds, and would normally also include a variety of other ingredients. In particular, the nutrients comprise bioavailable nitrogen and phosphorus compounds. In embodiments, the amount of nitrogen is in the range of 50–1000 ppm and preferably 400–700 ppm, and the amount of phosphate is in the range of 10–200 ppm and preferably 50–150 ppm. In addition to nitrogen and phosphorus compounds, the nutrient also contains optimized concentrations of compounds other than nitrogen, phosphorus, carbon, oxygen and sodium, required to support bacterial growth and therefore it is normally necessary to add to the reactor one or more of magnesium, manganese, inorganic or organic sulphur, calcium, iron, copper, cobalt, zinc, boron and molybdenum. It will be appreciated that a guide for selection of the relative amounts of nitrogen, phosphorus and other required nutrients is to relate their concentrations to the amounts of these components present in bacterial cells.

By providing an appropriate balance of nutrients and by adjustment of nutrient concentration, it is possible to achieve high levels of growth of hydrocarbon degrading bacteria and thus accelerated rates of hydrocarbon degradation. For example, Greasham (1993) "Biotechnology, a multivolume comprehensive treatise" (Eds, Rehm, H. J., et al) Vol. 3, p.131, VCH, Weinheim) has reported the typical non-carbon elemental composition of major bacterial components to be nitrogen 12.5%; phosphorus, 2.5%; potassium, 2.5%; sodium, 0.8%; sulphur, 0.6%; calcium, 0.6%; magnesium, 0.3%; copper, 0.02%; manganese, 0.01% and iron, 0.01%. Use of appropriate concentrations and ratios of nutrients tends to avoid a situation where growth is limited by depletion of one essential nutrient while all other nutrients may be present in excess.

The hydrocarbon provides the carbon source for growth; oxygen is obtained by aeration of the culture; sodium is provided in the form of caustic soda, required to adjust the pH. It is also understood that in some cases, some of these nutrient components may be present in sufficient quantities in some petroleum sludges or added water such that addition of selected nutrients may in some cases not be required. A disadvantage of relying on nutrients present as contaminants in sludge or water is that their concentrations may be variable, thus introducing inconsistencies into the process.

An example of a nutrient composition is as follows:

N (as $NH_4$, $NO_3$, or organic N): 500–700 ppm

P (as phosphate or related form): 100–120 ppm

K: 50–90 ppm

Mg: 10 ppm

Mn: 1–4 ppm

S (as sulphate or organic sulphur): 15 ppm

Ca: 8–12 ppm

Ferric Ion: 1 ppm

Copper: 0.5 ppm

Surfactant (nonionic or anionic): 1250 ppm

Co, Zn, B, Mo: 5–10 ppb each

The relative ratios of these nutrients are similar to the ratios typically found in the compositions of bacterial cells.

Other examples of nutrient compositions are given in the Examples herein below.

The aqueous mixture in the reactor is maintained at a temperature of a least 10° C. Preferred temperatures are 15–37° C., and especially 20–33° C. The aqueous mixture is maintained in the reactor for a period of time sufficient to reduce the amount of total petroleum hydrocarbon by at least 25%, especially by at least 50%. Typical times to effect the reduction in total petroleum hydrocarbon is 5–20 days, depending on the petroleum hydrocarbon being treated and the reactor conditions.

Subsequent to maintaining the aqueous mixture at the predetermined temperature for a period of time, the aqueous mixture is discharged from the reactor. The aqueous mixture has a reduced amount of hydrocarbons, including a reduced amount of the hydrocarbons from the group comprising the aromatics, resins and asphaltenes.

The present invention may be used for the biodegradation of sludges, as described herein. In particular, it may be used for biodegradation of a combination of hydrocarbon components from among the fractions: saturates, aromatics, resins and asphaltenes.

It may also be used to preferentially degrade a proportion of the hydrocarbons, in a manner which causes the emulsion to break and facilitate separation of a water phase and a residual oil phase. The residual oil phase may be recovered for reuse. Alternatively, the oil phase may be recycled to the next reactor cycle with the water phase only being discharged from the reactor. The water phase contains high concentrations of hydrocarbon-degrading bacteria. Thus, the water phase may be used for processes including soil bioremediation processes, by direct spraying of the water on the contaminated soil. Alternatively, the bacteria may be recovered from the water phase by known methods (filtration or centrifugation) and subsequently the bacteria may be applied in these other processes.

Where subsequent batches of sludge are to be degraded in the reactor, a portion of the degraded sludge amounting for example, to 1–20% of reactor volume, may be retained in the reactor following discharge, as an inoculum source for the next sludge batch.

In addition to the above described batch sludge degradation process, it is envisaged that the invention extends to fed-batch, continuous and semi-continuous reactor processes. In the fed-batch process, after the batch process has proceeded for some time, additional sludge and/or nutrients/surfactant are added at one or more intervals and the process is allowed to continue. In continuous or semi-continuous processes, degraded sludge is removed from the reactor and replaced with undegraded sludge and nutrients/surfactants on a continuous basis or at intervals, respectively.

The invention is illustrated by the following examples. Unless stated to the contrary, all examples of the invention illustrated herein were conducted under non-sterile conditions. In addition, all biodegradation reactions exemplified herein used oil-in-water emulsions.

EXAMPLE I

The basal medium used in this example contained (per L): $KH_2PO_4$, 1.0 g; $Na_2HPO_4$, 1.5 g; $MgSO_4.7H_2O$, 0.2 g; $Na_2CO_3$, 0.1 g; $CaCl_2.2H_2O$, 0.05 g; $FeSO_4$, 0.005 g; $MnSO_4$, 0.02 g; and trace metal solution, 3 ml. The trace metal solution contained (per L): $ZnCl_2.4H_2O$, 0.0144 g; $CoCl_2$, 0.012 g; $Na_2MoO_4.2H_2O$, 0.012 g; $CuSO_4.5H_2O$, 1.9 g; $H_3BO_4$, 0.05 g and HCl, 35 ml. The initial pH of the nutrient was adjusted to 7.2.

A population of mixed bacterial culture was maintained in a cyclone fermenter with a working volume of one litre. Petroleum hydrocarbon-degrading bacteria were selected by their ability to grow on petroleum hydrocarbons as the sole carbon source in the basal medium described above. To initiate the selection of petroleum hydrocarbon-degrading bacterial culture, a mixed population of bacteria, isolated from hydrocarbon contaminated soil, was inoculated into basal medium supplemented with 2.0 g $NH_4Cl/L$ and 1.0 g $NaNO_3/L$ in the cyclone. Sludge A or 8 (60 g/L) was used as carbon source; the sludges are describe below. It was found that the bacterial population reached $10^8$ to $10^{10}$ CFU/ml in one week. Thereafter, the culture was maintained by removing 10% by volume of the reactor and replacing with 10% by volume of fresh basal medium and sludge everyday. Using this procedure, an actively growing culture was maintained.

Sludge samples were collected from different ponds or lagoons located at different oil refineries. TPH content (hexane extractable) was determined for each sludge. The composition of the different sludges is provided in Table 1.

TABLE 1

| Sludge Source | Hexane Soluble (%) | Hexane insoluble (%) | Water (%) |
|---|---|---|---|
| Sludge A | 25 | 13 | 62 |
| Sludge B | 13 | 3 | 84 |
| Sludge C | 12 | 11 | 77 |
| Sludge D | 65 | 15 | 20 |
| Sludge E | 31 | 16 | 53 |
| Sludge F | 22 | 6 | 72 |
| Sludge G | 89 | 11 | 0 |

EXAMPLE II

The nutrient medium used for biodegradation in this example consisted of the basal medium supplemented with 2.0 g urea/L and 1.0 g yeast extract/L.

Runs to determine the biodegradation of total petroleum hydrocarbons (TPH) with respect to incubation time were carried out in 250 ml Erlenmeyer flasks containing 10 ml of nutrient medium and 10 g of sludge, giving a final sludge concentration of 50% in the total flask contents. The flasks were inoculated with 0.6 ml of actively growing mixed culture from the cyclone, maintained as described above, and incubated for 24 days at 25° C.

Residual TPH content was determined as follows. At different time intervals, whole flask contents were extracted with 40 ml of hexane and centrifuged at 10 000 rpm for 20 minutes. The hexane layer (top) was pipetted out and transferred to a pre-weighed vial. The hexane was allowed to evaporate in a fumehood and residual oil was weighed to determine total petroleum hydrocarbons (TPH). The results are given in Table 2

TABLE 2

| Incubation Time (Days) | TPH degradation (%) |
|---|---|
| 6 | 32 |
| 14 | 37 |
| 18 | 47 |
| 24 | 48 |

It was found that over a period of 18 days, about 47% degradation of TPH occurred. No significant difference in degradation levels was obtained between 18 days and 24 days.

EXAMPLE III

In order to investigate the effect of surfactant on TPH biodegradation, 5 different surfactants were tested at 0.25% concentration.

In each test, 10 ml of nutrient medium, 10 g of sludge oil and 0.5 ml of stock surfactant solution (10% aqueous) were placed in a 250 ml Erlenmeyer flask. The contents of the flask were inoculated with 0.6 ml of actively growing culture from a cyclone fermenter and incubated on a rotary shaker (200 rpm) for 14 days at 25° C. Residual TPH content was determined after extraction with hexane. The results are given in Table 3.

TABLE 3

| Surfactant | TPH degradation (%) |
|---|---|
| None | 46 |
| Igepal ™ C0-630 | 66 |
| Biosoft ™ EN-600 | 63 |
| Sorbex ™ PM030 | 42 |
| Witcomul ™ 4078 | 41 |
| Marlipal ™ O 13/120 | 45 |

All surfactants gave an oil-in-water emulsion. Out of 5 surfactants tested, 2 surfactants viz. Igepal CO-630 and Biosoft EN600, were found to be more effective. About 66% degradation of TPH was achieved in the presence of the Igepal surfactant, compared to 46% in a control run in the absence of any surfactant.

EXAMPLE IV

The effect of sludge concentration on TPH biodegradation was investigated using two different sludges at concentrations of 20%, 50% and 90%. Each set of flasks contained the following: (a) 16 ml of nutrient medium and 4 g of sludge; (b) 10 ml of nutrient rriedium and 10 g of sludge; (c) 20 g of sludge and 2 ml of 10×strength nutrient medium. The flasks (250 ml) were inoculated with 600 pl of actively growing culture from a cyclone fermenter, and incubated on a rotary shaker (200 rpm) at 25° C. for 14 days. The results are given in Table 4.

TABLE 4

| Sludge Type | Sludge Concentration % v/v | TPH degradation (% of starting amount) |
|---|---|---|
| Sludge A | (a) 20 | 70 |
| | (b) 50 | 56 |
| | (c) 90 | 36 |
| Sludge B | (a) 20 | 91 |
| | (b) 50 | 81 |
| | (c) 90 | 56 |

It was found that sludge concentration affected the extent of TPH degradation.

EXAMPLE V

A medium referred to herein as NPK medium was formed by replacing, $KH_2PO4$ and $Na_2HPO_4$, in the nutrient medium, were replaced with a NPK (nitrogen: phosphorus: potassium) fertilizer (15:30:15) at a rate of 0.8 g/L. All other components in the medium were the same as described before. Experiments were conducted with two different sludges. Erlenmeyer flasks contained 50% v/v NPK medium and 50% v/v sludge together with 0.25% surfactant (Igepal CO-630) based on total culture volume.

Other conditions were the same as those described in Example III. The results are given in Table 5.

TABLE 5

| Source of Sludge | Medium | TPH degradation (% of starting amount) |
|---|---|---|
| Sludge A | Nutrient | 60 |
| | NPK | 58 |
| Sludge B | Nutrient | 73 |
| | NPK | 71 |

No significant differences were observed between the results obtained with basal medium and with NPK medium.

EXAMPLE VI

Biodegradation of TPH in different sludges was performed in flasks under shaking conditions. Erlenmeyer flasks containing NPK medium and sludge (50:50, v/v) were inoculated with the actively growing mixed culture, and incubated for 14 days at 30° C.

TABLE 6

| Sludge Type | Sludge-Concentration (%) | TPH degradation (%) |
| --- | --- | --- |
| A | 50 | 61 |
| B | 50 | 76 |
| D | 12.5 | 54 |
| E | 50 | 89 |
| G | 10 | 42 |

The results indicate that 42 to 89% degradation of TPH can be obtained using this process. Sludge G. being a heavy oil sludge, was degraded the least.

EXAMPLE VII

Alternative complex nitrogen sources to yeast extract were tested using Sludge A and Sludge B. This experiment was carried out using NPK medium 50% v/v, sludge 50% v/v and 0.25% v/v Igepal CO-630 in 250 ml Erlenmeyer flasks incubated at 25° C. for 14 days on a rotary shaker (200 rpm). The results are given in Table 7.

TABLE 7

| Sludge Type | Complex nitrogen source | TPH degradation (% of starting amount) |
| --- | --- | --- |
| Sludge A | Yeast extract | 59 |
|  | Corn steep solids | 52 |
|  | Cottonseed protein | 51 |
|  | Potato protein | 49 |
| Sludge B | Yeast extract | 75 |
|  | Corn steep solids | 85 |
|  | Cottonseed protein | 83 |
|  | Potato protein | 79 |

All the alternative nitrogen sources tested, at final culture concentration of 0.5 g/L, gave similar performance to 0.5 g/L yeast extract.

EXAMPLE VIII

Biodegradation of different hydrocarbon fractions was tested, using Sludge B. Erlenmeyer flasks that contained 50% v/v sludge, 50% NPK medium and 0.25% Igepal CO630. After inoculation with an actively growing culture, flasks were incubated on a rotary shaker for 14 days at 30° C. The whole content of the flask was extracted once with hexane followed by dichloromethane. After centrifugation both extracts were combined and the solvent evaporated. Residual hydrocarbon was dissolved in hexane and centrifuged. A known weight of hexane soluble portion was passed through a column (0.75×27 cm) of silica gel (activated at 100° C. overnight). Successive applications of hexane (120 ml), dichloromethane (30 ml) and chloroform:methanol (1:1, 15 ml) produced fractions containing saturated, aromatics and polar (resins) hydrocarbons, respectively. The results are given in Table 8.

TABLE 8

| Fraction | % of total hydrocarbons | % degradation |
| --- | --- | --- |
| Saturate | 73–77 | 73–77 |
| Aromatics | 11–13 | 65–69 |
| Resins | 8–10 | 61–63 |

The results indicate that all of the major TPH component were degraded.

EXAMPLE IX

This experiment was conducted to determine if pretreatment with an advanced oxidative process (Fenton's reagent viz. $H_2O_2+FeSO_4$) could enhance TPH degradation in sludge. Pretreatment and subsequent biodegradation was carried out in the same flask. For pre-treatment, Sludge A was diluted with water to obtain 20 ml of a 50% v/v sludge concentration. pH of the mixture was adjusted to 4.0 by adding 4N HCl. $H_2O_2$ and $FeSO_4$ were added at concentrations of 0.3% v/v and 10 millimolar, respectively.

The flasks were kept on a rotary shaker (200 rpm) at 25° C. for 2 days. Thereafter, 2 ml of NPK medium (10 times concentrated) were added in solid form and the pH adjusted to 7.0 by addition of 2N NaOH solution. The flasks were inoculated with an actively growing inoculum (600 pl) from a cyclone fermenter and incubated on a rotary shaker for a period of 28 days. The following treatments were tested: (a) no pre-treatment or addition of surfactant; (b) Fenton's reagent pre-treatment, without surfactant; (c) addition of 0.25% Igepal CO-630, without Fenton's pretreatment; and (d) Fenton's reagent pretreatment in the presence of 0.25% Igepal CO-630. The results are given in Table 9.

TABLE 9

| | Incubation time (days) | | | |
| --- | --- | --- | --- | --- |
| | 7 | 14 | 21 | 28 |
| Treatment | % TPH degradation | | | |
| None | 28 | 42 | 46 | 53 |
| Fenton's pre-treatment (48 h) | 36 | 61 | 64 | 65 |
| Surfactant (0.25%) | 42 | 61 | 66 | 72 |
| Fenton's pre-treatment (48 h) in the presence of surfactant (0.25%) | 43 | 64 | 68 | 72 |

The results indicate that pre-treatment of sludges with an oxidative agent or addition of surfactant significantly increased the extent of degradation of TPH in sludge oil.

EXAMPLE X

The performance of biodegradation of TPH in different sludges was evaluated in different reactor types. The reactors tested were of different configuration and scale. Biodegradation tests in Erlenmeyer flasks were performed as described in other examples. Cyclone fermenters were as described above. Air-lift reactors were fitted with spargers and connected to an air source. The mixing in the reactors was achieved by supplying air at the rate of 0.5 volume/volume/minute and 0.125% surfactant. NPK medium and sludge (50:50 v/v) was used in these experiments. All the reactors were inoculated with an actively growing mixed culture. The results are presented in Table 10.

TABLE 10

| Sludge Type | Reactor Type | Scale of Process (litres) | Incubation time (days) | TPH biodegradation (%) |
| --- | --- | --- | --- | --- |
| E | Erlenmeyer flask | 0.25 | 20 | 74 |
| E | Air-lift | 150 | 14 | 70 |
| F | Air-lift | 150 | 14 | 84 |
| B | Erlenmeyer flask | 0.25 | 14 | 81 |
| B | Cyclone | 1 | 8 | 85 |
| C | Air-lift | 18000 | 11 | 84 |

The results show that efficient sludge degradation occurs in different aerated reactor types and at different scales of operation ranging from laboratory to production scale.

EXAMPLE XI

Biodegradation of TPHs in clay fines was evaluated in shake flask cultures. Flasks containing clay fines (TPH, 10.5%, w/v, and NPK medium 50:50, w/v) and 0.25%, w/v Igopal CO-630 were inoculated with an actively growing culture and incubated for 14 days at 30° C. The residual TPH content was determined and results are shown in Table 11.

TABLE 11

| Incubation Time (days) | % TPH degradation |
| --- | --- |
| 7 | 77 |
| 14 | 92 |

The results indicate that 92% of clay firnes can be achieved in 14 days by using this process.

The kinds of oily hydrocarbons with which the invention is generally concerned have only a small solubility in water-typically, they will dissolve in water only up to a level of the order of 100 ppm. However, the bio-degradation of the oily hydrocarbons may be regarded as taking place mainly on this small fraction that has gone into solution, or at least on the interface between the dissolved and the undissolved hydrocarbon.

Although it is something of a simplification, it may be regarded that the oily sludge material has to go into solution before it can be degraded. Degradation progresses as the dissolved oil is degraded, whereupon the water is no longer saturated, whereupon some more oil can pass into solution. It is the task of the designer of the system to provide conditions in the reaction-vessel that will promote a large oil/water interface area, and will promote a large concentration-gradient at the interface.

It is notoriously difficult to do this with oily sludge—the oily sludge that accumulates at refineries, as residue in an API separator, for example, and at many other sites. Traditionally, it has not been commercially practical to engineer degradation of the sludge at a rapid enough rate that the degradation can be performed actually on-site. The result has been that the sludge, traditionally, has to be carried away as a hazardous waste.

The present invention aims to create conditions which promote the breakdown reactions to take place at a rapid enough rate that it becomes economical, as to time, and as to facilities required, for the degradation to be performed on-site, i.e at the place where the hydrocarbon sludge has accumulated.

Some of the difficulties of promoting rapid breakdown of oily sludge will now be described.

If there is any other source of carbon in the mixture, other than the oily hydrocarbons to be broken down, it can be difficult for the bacteria that degrade the oils to become established and viable. For example, even surfactants can provide a carbon source, whereby it can happen that microbes of the type that degrade the surfactants thrive at the expense of the microbes that degrade the oil. Any organic material that can serve to nourish bacterial colonies should be kept to a minimum in the reaction-vessel, since the viability of the bacteria that thrive on oily sludge can be compromised if carbon sources other than oily sludge are bio-available. The designer's aim is to maximise the viability of bacteria that feed on oily sludge, and thus the aim is to eliminate or reduce factors that might compromise such viability.

Also, it is recognised that careful attention should be given to ensure that the nutrients needed by the oil breakdown bacteria are present in the reaction-vessel. The designer who is aiming to maximise the rate of degradation should ensure that none of the nutrients needed by the breakdown microbes become depleted. The mix of nutrients required can be assessed by identifying the bacteria that are the most effective to break down the hydrocarbons, and by carrying out an analysis of the cellular composition of those bacteria, to determine just what elements, minerals, etc are present in the cell structure. The nutrient mix can then be adjusted to suit. Where the sophistication is justified, the invention can be put into practice by analysing the bacteria cells, noting their composition, and supplying nutrients accordingly. It is recognised, however, that in most cases the hydrocarbons that are to be degraded are sufficiently similar, from one site to another, that a pre-prepared mix of nutrients can be very near to what would be the ideal mix for most applications. It is recognised that in fact there is little need for a sophisticated analysis of what is actually present at the individual sites.

Thus, a preferred aspect of the invention is to supply a pre-prepared mix of nutrients. The pre-prepared mix itself can be arrived at by such techniques as bacteria cell analysis, and experimentation on a variety of sludges.

It is also preferred to supply all the nutrients needed for degrading a batch of hydrocarbons at one time, at the commencement of the degradation. An excess may be provided to allow for contingencies.

When pre-prepared nutrients are added, in quantity, into a reaction-vessel, it may be expected that it will take a period of time, for example a day or two, for the bacteria to build up and colonise the sludge; but then the rate of breakdown will increase and will proceed at the rapid rate until breakdown is complete. Sometimes, the rate can drop off as breakdown approaches completion, due to the microbes becoming starved out, but it is recognised that the slowing of the rate of breakdown as breakdown nears completion is not particularly significant.

The expectation is that the one application of nutrients at the start of treatment is enough to see the whole batch through to the level of degradation at which the water can be discharged. Thus, there is no need for remediation partway through a degradation treatment.

Another aspect of the invention may be utilised when the remediation approach is favoured. Here, the breakdown reaction is allowed to proceed, and nothing is done to the reaction-mixture. However, periodic assessment is carried out, to ascertain whether any of the nutrients are becoming depleted. This can be done either directly, by looking for the nutrients, or indirectly, by looking at the rate at which degradation is proceeding. That is to say, if the degradation rate has slowed, an analysis can be done to determine which nutrient is missing, and make-up quantities of that one can be added as required; alternatively, in response to a measured slowing of the degradation rate, a fresh supply of all the nutrients can simply be added to the mix.

When considering remediation measures, one problem facing the designer of an oily-sludge breakdown system is that the oily hydrocarbons become sorbed onto solid materials that happen to be present in the mixture, whereby it becomes all the more difficult for the sorbed hydrocarbons to pass into solution. This problem can be alleviated by the presence, in the reaction-mixture, of some of the lighter petroleum fractions; or it can be alleviated by a more thorough emulsification, i.e providing enough mechanical stirring and agitation to break down the solids into very small particles, and supplying surfactants which ensure each small particle has adequate exposure to aerated water.

However, the more vigorous the agitation, and aeration, of the sludge, the more the lighter fractions tend to volatilise and disappear. Thus the agitation has to be all the more vigorous. It is preferred, in some cases, where the sludge has become very heavy, such that agitation and aeration are being impeded by the heaviness and viscosity of the sludge, for a lighter oil fraction to be actually added to the reaction-mixture. Preferably this added oil should be light, but not volatile or it will quickly disappear; and diesel oil is usually the most suitable material to be added.

Thus, in a case where the degradation reaction has slowed, and it is suspected that the reason is that the hydrocarbons are sorbed too strongly onto the solids, the addition of a quantity of diesel oil can be instrumental, in itself, to bring up the degradation rate once more to rapid levels.

By focussing on the measures as described herein, hydrocarbons can be broken down at a rate, typically, of ten kilograms of hydrocarbon per tonne of total reaction-mixture per day. Generally, in all cases of treatment of water contaminated with oily sludge, routine measurements are made, to determine when the treatment mixture can be discharged. Thus, it can readily be determined what is the rate of degradation. If it is found that the rate was formerly above ten kilograms per tonne per day, but has now slowed a little below that rate, it is an easy matter to add a quantity of diesel oil into the mixture, and doing so can be useful, in that it might be effective to restore the rate. However, if adding a small quantity of diesel oil does not work, that is an indication that the fault lies elsewhere, and it is detrimental to add more oil, since the added oil that now remains has to be degraded.

As regards the level at remediation should be done: generally, if the rate of degradation falls below about five kilograms of hydrocarbons per tonne of reaction-mixture, per day, that is an indication that remediation is required. The level at which remediation measures are triggered may be set rather higher, say at ten kilograms of hydrocarbons per tonne of reaction-mixture, per day, especially in a case where the degradation rate formerly exceeded that level and has now slowed. In some cases, particularly where the higher rate simply cannot be achieved, for example due to a large mass of solids in the sludge, remediation would be triggered at the lower level. A degradation rate of ten kilograms hydrocarbons per tonne of mixture, per day, is a highly commercially-worthwhile rate, on an industrial scale; so, indeed, is five kilograms per day, in many cases. It is recognised that most of the kinds of sludges likely to be encountered in e.g refineries can readily be broken down at the ten kilogram per day rate, whereby remediation should be triggered if the rate falls below that.

The remediation measures to be taken, if the breakdown rate does fall below the threshold, include checking that the physical parameters of the treatment procedure are being done properly, as to maintenance of temperature and pH, for example. Also, the degree of agitation and aeration of the reaction mixture should be checked. Preferably, agitation is not done by mechanical stirring, but is done as a consequence of the aeration. Aeration is done preferably by blowing air through perforated pipes located in the reaction-vessel, and the layout of pipes and the perforations therein should be designed to ensure that no portion of the whole reaction-mixture can be static.

In a treatment vessel accommodating several tonnes of treatment mixture, an adequate aeration system may include pipes spaced say 20 cm apart, and with a 3 mm hole perforated every 20 cm along the length. Air is supplied at a high enough pressure to ensure a forceful stream out of every hole. The holes can be angled downwards, so as to sweep the floor of the vessel and prevent the formation of static pockets of sludge. The designer's aim should be to maximise the access of each globule of sludge to water, air, surfactant, and of course to viable colonies of the appropriate microbes. The importance of adequate agitation and aeration of the treatment mixture is emphasised, if the desired high breakdown rate is to be achieved.

In a case where the breakdown reactions cannot be brought up to the desired rate from the start, the amount of hydrocarbon in the reaction-mixture should be checked. The hydrocarbons concentration might be so high that it is then too difficult to distribute adequate quantities of aerated water to all the undissolved particles of oily material. This condition occurs when the hydrocarbon content is above about 150 kilograms of hydrocarbons per tonne of mixture. There is little alternative in this case but to add water to the mixture, to dilute it.

The remediation measures to be taken, if the breakdown rate does fall below the threshold, include checking that an adequate amount of surfactant is present in the reaction-mixture. For the desired rapid breakdown rates to be achieved, the oily materials and the water in the reaction mixture should be thoroughly and completely emulsified. At the high hydrocarbon concentrations for which the invention is intended, this can only be ensured by adding a surfactant, or a surfactant-formulation.

A surfactant-formulation that may be used in the pre sent invention is defined as a subs tance of such nature that no more than 1250 grams of the su bs tance, when mixed in with a mixture comprising 100 kg of crude oil and 900 kg of water (i.e a 10% mixture of crude oil and water), when thoroughly mixed, form an oil-in-water emulsion. The surfactant-formulation can include substances that are not traditionally considered to be surfactants; for example, a substance that comprises, say, 1000 grams of a traditional surfactant plus 250 grams of diesel oil, can be a surfactant-formulation, as defined, provided that such a substance will serve to turn the mixture into an oil-in-water emulsion.

The amoun t of surfactant-formulation to be provided depends on the hydrocarbon content of the concentration of the reaction-mixture-as the hydrocarbons are degraded, less surfactant is needed. The mass of surfactant should be at least one eightieth of the mass of the hydrocarbons.

However, also, the amount of surfactant might have to be increased when the mass of solids is large, i.e the mass of surfactant should also be at least one fortieth of the mass of solids. Also, the surfactant should be at least 0.5 kg per tonne of the overall mass of the reaction-mixture.

Thus, remediation should be considered if the degradation rate falls below about five or ten kilograms per day, as mentioned, and remediation should take the form of checking that the va rious aspects of the treatment procedures, as described, are in place, including checking that the surfactants, all the nutrients, the aeration, the agitation, and so on, as described, are all in place. It is recognised that, by focussing on optimising all these aspects, the rate can be increased at which the hydrocarbons degrade, to a rate that can be expected to be above the threshold.

In many cases, it is not necessary to supply add itional bacteria, in that oily sludges already often contain at least a small quantity of the required bacteria. Thus, if the right nutrients are supplied, and the physical conditions are optimised, as described, the bacteria that feed on the sludge will gra dually colonise the whole body of sludge, and the rapid rate of breakdown will commence.

However, in some cases, this initial spreading of the bacteria might take several days. In that case, it might be preferred to add a pre-prepared inoculum of the appropriate bacteria.

This can be done be utilising a portion of the batch of sludge that has just been treated. The portion of treated water should be extracted at a time when it still contains large quantities of viabl e bacteria (i.e before the bacteria become starved out). The mass of the portion should be between 5% and 30% of the mass of the fresh batch of sludge to be treated, and the portion is added into the fresh batch, with the nutrients, surfactants, etc. When that is done, it may be expected that the rate of breakdown can be brought up to the rapid rates in less than one day.

Retaining a portion of the previous batch to inoculate the next batch can be continued indefinitely. However, analysis should be carried out periodically to ensure that unwanted substances, such as residue of unused minerals from the supplied quantities of nutrients, are not building up in the treatment vessel. The danger resulting from a build-up of such substances is that the micro-biological breakdown reactions can be compromised, and also the substances might constitute pollutants that affect the ability of the treated water to be freely discharged.

Alternatively, the inoculum can be prepared off-site. In this case, a batch of the inoculum should be prepared starting from a mass of hydrocarbon sludge that is known to be undergoing bacterial breakdown. This may be, for example, a quantity of aerated crude oil. The crude oil should be mixed in with water such that the oil is no more than about two percent of the mass of the mixture of oil and water. The desired bacteria are promoted by adding the nutrient mix as described, and then thoroughly aerating the mixture, at the right temperature, pH, etc, for a period of time. The operator can determine when viable quantities of microbes are present by determining how much of the hydrocarbon content of the incubator-mixture has been degraded. Once the hydrocarbon content has fallen by two thirds or more, it is certain that viable quantities of bacteria must be present in the inoculum mixture in the incubator vessel, and the inoculum is ready to be transferred to the reaction-vessel.

Surfactants should not be added to the inoculum incubator-vessel. The two percent oil-water mixture is dilute enough that full emulsification can take place without surfactants, and the presence of surfactants might lead to the promotion of bacteria that feed on the surfactants rather than bacteria that feed on the oil.

It has been found that providing all the nitrogen required in the nutrients in the form of protein nitrogen (e.g yeast extract) is effective to speed up the rate at which the required bacteria spread through the mixture in the incubator vessel. However, a fraction of the nitrogen can be in non-protein form. (The bacteria need the nitrogen in protein form, and it takes time for the bacteria to effect the conversion if the nitrogen is in non-protein form.) Thus, it is preferred that, especially when preparing an inoculum, but in fact also in the reaction-mixture itself, all or most of the nitrogen should be in protein form.

What is claimed is:

1. A procedure for treating water contaminated with oily hydrocarbon material, by promoting rapid biodegradation of the oily hydrocarbon material, where the oily hydrocarbon material is present as a component of a reaction-mixture, with the water and non-bio-degradable solids, which is present as an initial batch of the reaction-mixture in a reaction-vessel, including:

assessing the magnitude of the initial mass of the water in the reaction-mixture, being W0 tonnes, the initial mass of the oily hydrocarbon material, being H0 tonnes, and the initial mass of the non-bio-degradable solids, being S0 tonnes, and noting the combined total W0+H0+S0 as the mass T0 tonnes of the initial batch;

where the procedure is carried out on an industrial scale, in that the mass T0 is several tonnes;

assessing the fraction H0/T0 and, responsively to the fraction being so large that the reaction mixture contains a substantial mass of undissolved hydrocarbons, carrying out the following micro-biological treatment procedure:

supplying a mix of nutrients, and adding same to the reaction-mixture in the reaction-vessel, where the mix of nutrients includes, per tonne of the combined mass T0:

nitrogen, at least 150 grams;

phosphorus, between 50 grams and 1000 grams;

potassium, between 25 grams and 500 grams;

magnesium, sulphur, calcium, at least 5 grams of each;

manganese, at least one gram;

iron, at least 0.5 grams;

copper, at least 0.25 grams;

and cobalt, zinc, boron, molybdenum, at least 0.001 grams of each;

providing a surfactant formulation in such amount that, when the surfactant is thoroughly mixed into the initial batch of reaction-mixture, the mixture forms an oil-in-water emulsion;

supplying air to the reaction-vessel, and blowing the air into the reaction-mixture in such manner as to agitate and aerate the reaction-mixture, with such overall flowrate and vigour as to cause all portions of the reaction-mixture in the reaction-vessel to be mechanically mixed and stirred and thoroughly aerated;

maintaining the temperature of the reaction-mixture within the range 20–37 degC.;

maintaining the pH of the reaction mixture at a pH suitable for bacterial groweth and hydrocarbon degradation;

assessing the magnitude of the mass Ht of the oily hydrocarbon material at time t, from time to time, as the mass diminishes, as treatment progresses;

responsively to the mass Ht reaching an acceptably safe level, whereby the batch of reaction-mixture now comprises a batch of treated-mixture, discharging the batch of treated-mixture from the reaction-vessel.

2. Procedure of claim 1, including maintaining the pH of the reaction mixture within the range 6.4 to 7.6, and wherein, in the mix of nutrients, the said 150 grams of nitrogen, at least 40 grams is protein nitrogen.

3. Procedure of claim 2, including, responsively to the initial mass H0 being greater than 15% of T0 tonnes, diluting the reaction-mixture with water.

4. Procedure of claim 1, including:
computing the amounts of the said nutrients needed in respect of the said T0 tonnes;
making up the quantity of a nutrient-mix, as a physical mixture, at a location remote from the reaction-vessel;
where the nutrient-mix comprises the nutrients according to the said mix of nutrients;
placing the nutrient-mix in shipping containers;
transporting the containers to the reaction-vessel;
transferring the nutrient-mix from the shipping containers into the reaction-vessel.

5. Procedure of claim 1, including
providing the surfactant-formulation in the form of a substance of such nature that no more than 1250 grams of the substance, together with 100 kg of crude oil and 900 kg of water, when thoroughly mixed, form an oil-in-water emulsion;
supplying the said surfactant-formulation, and adding same to the reaction-mixture in the reaction-vessel, in an amount which is at least the greatest of:
one fortieth of the mass S0;
one eightieth of the mass H0; and
0.5 kg per tonne of the mass T0 tonnes.

6. Procedure of claim 1, including:
in the case where a previous batch of substantially similar oily hydrocarbon material has recently been treated, and now comprises a batch of treated-mixture;
making preparations for treating the initial batch of mass T0 of the reaction-mixture in the reaction-vessel, by the following procedure:
retaining a mass R0 tonnes from the batch of treated-mixture, where R0 is between 5% and 30% of the mass T0;
and mixing the mass R0 in with the reaction-mixture in the reaction-vessel.

7. Procedure of claim 1, where all of the at least 150 grams of nitrogen per tonne T0 included in the mix of nutrients is in the form of protein nitrogen.

8. Procedure of claim 1, including:
making preparations for treatment of the said initial batch of mass T0 of the reaction-mixture in the reaction-vessel by preparing a bacteria-laden inoculum, by the following procedure:
selecting an environment in which oily organic materials are present, with water, and air, and where the environment contains viable aerobic bacteria of a kind that degrade the oily material;
extracting a mass IH0 kg of the said oily organic materials from the said environment;
providing an incubator-vessel, and placing the mass IH0 in the incubator-vessel, together with a mass IW0 kg of water, to form an inoculum-mixture of mass IT0 kg in the incubator-vessel;
assessing the magnitude of the mass IH0 kgs, and the mass IT0;
supplying a mix of nutrients, and adding same to the inoculum-mixture in the incubator-vessel, where the mix of nutrients includes, per kg of the mass T0:
nitrogen, at least 150 milligrams;
phosphorus, between 50 mg and 1000 mg;
potassium, between 25 mg and 500 mg;
magnesium, sulphur, calcium, at least 5 mg of each;
manganese, at least one mg;
iron, at least 0.5 mg;
copper, at least 0.25 mg;
and cobalt, zinc, boron, molybdenum, at least 0.001 mg of each;
supplying air to the incubator-vessel, and blowing the air into the inoculum-mixture in such manner as to agitate and aerate the inoculum-mixture, with such overall flowrate and vigour as to cause all portions of the inoculum-mixture in the incubator-vessel to be mechanically mixed and stirred and thoroughly aerated;
maintaining the temperature of the inoculum-mixture within the range 25–35 degC.;
maintaining the pH of the inoculum-mixture within the range 6.4 to 7.6;
assessing the magnitude of the mass IH kg of the oily organic material, from time to time, as that mass diminishes, as preparation of the inoculum progresses;
responsively to the mass IH being diminished from the mass IH0 by enough of an increment to demonstrate that bacteria effective to degrade the oily organic materials are present and viable in the incubator-mixture, whereupon the inoculum-mixture is now termed the prepared-inoculum, transferring the prepared-inoculum to the reaction-vessel.

9. Procedure of claim 8, where the mass IT0 of the inoculum-mixture is between one hundredth and one thousandth of the mass T0 of the batch of the reaction-mixture.

10. Procedure of claim 1, including carrying out the said micro-biological treatment procedure responsively to the masses W0,H0,S0,T0 being such that the reaction mixture can be characterised as an oily sludge.

11. Procedure of claim 1, including carrying out the said micro-biological treatment procedure responsively to the mass H0 being greater than 3% of T0 tonnes.

12. Procedure of claim 1, including:
providing the nutrients in the nutrient mix in the form of mineral salts;
ascertaining what salt residues will remain in the treated-mixture discharged from the reaction-vessel;
and ascertaining that such residues, in amount and composition, are acceptable from the environmental contamination standpoint.

13. Procedure of claim 1, including providing at least a portion of the P and K in the said nutrient mix in the form of potassium phosphate salts.

14. Procedure of claim 1, including providing at least a portion of the P and Na in the said nutrient mix in the form of sodium phosphate salts.

15. Procedure of claim 1, where the threshold rate is 0.01 tonnes Ht per day, per tonne Tt.

16. Procedure for treating water contaminated with oily hydrocarbon material, by promoting rapid biodegradation of the oily hydrocarbon material;
where the oily hydrocarbon material is present as a component of a reaction-mixture, with the water to be treated, and non-bio-degradable solids, in a reaction-vessel;

where, at time t, the magnitude of the mass of the water in the reaction-mixture is Wt tonnes, the mass of the oily hydrocarbon material is Ht tonnes, and the mass of the non-bio-degradable solids is St tonnes, and the total mass of the reaction-mixture, being Wt+Ht+St, is Tt tonnes;

the procedure includes:
  assessing HtrTt, being the fractional mass, in tonnes, of the oily hydrocarbon material per tonne of the reaction-mixture;
  assessing the magnitude of Ht/Tt from time to time, and assessing the rate of fall thereof, being HtfTt per day;
  responsively to the rate of fall Ht/Tt per day being slower than a threshold rate, assessing whether the following parameters of the reaction-mixture meet the following conditions:
    that Ht/Tt is less than 0.15 tonnes Ht per tonne Tt;
    that the temperature of the reaction-mixture is within the range 20–37 degC.;
    that the pH of the reaction mixture is within the range 6.5 to 7.5;
    that the vigour and amount of air blown into the reaction-mixture are enough to cause the whole of the reaction-mixture in the reaction-vessel to be mechanically mixed and stirred thoroughly;
  and, responsively to the parameters being outside these conditions, adjusting the parameters accordingly;
  where the threshold rate is 0.005 tonnes Ht per tonne Tt per day;
  again assessing the fraction Ht/Tt, and, responsively to the fraction Ht/Tt reaching an acceptably safe level, whereby the batch of reaction-mixture now comprises a batch of treated-mixture, discharging the batch of treated-mixture from the reaction-vessel.

17. Procedure of claim 16, including carrying out the procedure in respect of a batch of reaction-mixture that has previously undergone degradation of the oily hydrocarbon material at a degradation rate faster than the threshold rate, and in which the degradation rate has since slowed to slower than the threshold rate.

18. Procedure of claim 17, including, responsively to the rate of fall of Ht/Tt being slower than a rate of 0.01 tonnes Ht per tonne Tt per day, adding diesel oil into the reaction-vessel, in an amount exceeding one eightieth of the mass St tonnes of the non-bio-degradable solids present in the reaction-vessel.

19. Procedure of claim 17, including responsively to the rate of fall Ht/Tt per day being slower than the threshold rate, assessing whether sufficient surfactant is present in the reaction-vessel that the whole of the reaction-mixture in the reaction-vessel, thus agitated, is thoroughly emulsified, and if not, adding surfactant accordingly.

20. Procedure of claim 16, including:
  responsively to the rate Ht/Tt per day being slower than the threshold rate, assessing whether the following nutrients are all present in quantities to ensure they are bio-available to bacteria throughout the reaction-mixture:
    nitrogen
    phosphorus
    potassium
    magnesium
    manganese
    sulphur
    calcium
    iron
    copper
    cobalt
    zinc
    boron
    molybdenum
    sodium
  responsively to the nutrients not being present, adding nutrients accordingly.

21. Procedure of claim 16, including, responsively to the nitrogen being depleted, adding nitrogen in the form of protein nitrogen.

22. Procedure of claim 16, including:
  identifying the bacteria in the reaction-vessel that are viable and effective to degrade the oily-hydrocarbon-material;
  from an analysis of the cell composition of the said bacteria, assessing what metals, minerals, and other nutrients, are present in the cell composition;
  making those nutrients bio-available to the bacteria in the reaction-vessel, in amounts to ensure the bacteria are viable.

23. Procedure for preparing a bacteria-laden inoculum, which is suitable for treating water contaminated with oily hydrocarbon materials:
  selecting an environment in which oily organic materials are present, with water, and air, and where the environment contains viable aerobic bacteria of a kind that degrade the oily material;
  extracting a mass IH0 kg of the said oily organic materials from the said environment;
  providing an incubator-vessel, and placing the mass IH0 in the incubator-vessel, together with a mass IW0kg of water, to form an inoculum-mixture of mass IT0 kg in the incubator-vessel;
  assessing the magnitude of the mass IH0 kgs, and the mass IT0;
  responsively to the mass IH0 being more than two percent of the mass IT0, diluting the inoculum-mixture with water;
  supplying a mix of nutrients, and adding same to the inoculum-mixture in the incubator-vessel, where the mix of nutrients includes, per kg of the mass T0:
    nitrogen, at least 150 milligrams;
    phosphorus, between 50 mg and 1000 mg;
    potassium, between 25 mg and 500 mg;
    magnesium, sulphur, calcium, at least 5 mg of each;
    manganese, at least one mg;
    iron, at least 0.5 mg;
    copper, at least 0.25 mg;
    and cobalt, zinc, boron, molybdenum, at least 0.001 mg of each;
  supplying air to the incubator-vessel, and blowing the air into the inoculum-mixture in such manner as to agitate and aerate the inoculum-mixture, with such overall flowrate and vigour as to cause all portions of the inoculum-mixture in the incubator-vessel to be mechanically mixed and stirred and thoroughly aerated;
  maintaining the temperature of the inoculum-mixture within the range 25–35 degC.;
  maintaining the pH of the inoculum-mixture within the range 6.4 to 7.6;
  assessing the magnitude of the mass IH kg of the oily organic material, from time to time, as that mass diminishes, as preparation of the inoculum progresses;
  responsively to the mass IH being diminished from the mass IH0 by enough of an increment to demonstrate that bacteria effective to degrade the oily organic materials are present and viable in the incubator-mixture, whereupon the inoculum-mixture is now termed the prepared-inoculum, transferring the prepared-inoculum to the reaction-vessel.

24. Procedure of claim 23, where the oily organic material containing the aerobic bacteria is unrefined crude oil.

25. Procedure of claim 23, where the magnitude of the said increment by which the mass IH is diminished from the mass IH0 is at least two-thirds of the mass IH0.

26. Procedure of claim 23, including ensuring that no further organic materials, other than the mass IH0 of oily organic materials from the said environment, are added into the incubator-vessel, being organic materials, including surfactants, of a kind that can serve as a carbon source for the bacteria in the inoculum.

27. Procedure of claim 26, including excluding surfactants from the inoculum-mixture in the incubator-vessel.

28. Procedure of claim 23, including mixing diesel oil in with the inoculum-mixture in the incubator-vessel, in an amount exceeding one fortieth of the mass IT0.

* * * * *